US010028363B2

(12) United States Patent
Yun

(10) Patent No.: US 10,028,363 B2
(45) Date of Patent: Jul. 17, 2018

(54) APPARATUS AND METHOD FOR LAMP CONTROL IN VEHICLE

(71) Applicant: HYUNDAI MOTOR COMPANY, Seoul (KR)

(72) Inventor: Hyun Chul Yun, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/958,390

(22) Filed: Dec. 3, 2015

(65) Prior Publication Data

US 2017/0057401 A1 Mar. 2, 2017

(30) Foreign Application Priority Data

Aug. 27, 2015 (KR) ........................ 10-2015-0121027

(51) Int. Cl.
B60Q 1/14 (2006.01)
H05B 37/02 (2006.01)
H05B 39/04 (2006.01)
H05B 39/09 (2006.01)

(52) U.S. Cl.
CPC ....... H05B 39/047 (2013.01); H05B 37/0281 (2013.01); H05B 39/09 (2013.01); Y02B 20/42 (2013.01)

(58) Field of Classification Search
CPC ...... B60Q 1/14; B60Q 1/1415; B60Q 11/005; H05B 37/02; H05B 37/0281; H05B 39/047; H05B 39/09
See application file for complete search history.

(56) References Cited

U.S. PATENT DOCUMENTS

| 6,711,481 | B1 * | 3/2004 | King | B60Q 1/14 |
| | | | | 315/82 |
| 8,933,672 | B2 * | 1/2015 | Zhou | H01M 10/44 |
| | | | | 320/136 |
| 9,526,076 | B1 * | 12/2016 | Park | H04W 76/025 |
| 2010/0213846 | A1 * | 8/2010 | Thomas | G01S 13/88 |
| | | | | 315/82 |
| 2015/0367777 | A1 * | 12/2015 | Dunn | H05B 33/086 |
| | | | | 315/77 |

FOREIGN PATENT DOCUMENTS

| JP | 11-301340 A | 11/1999 |
| JP | 2001-069667 A | 3/2001 |
| JP | 2002-362219 A | 12/2002 |
| JP | 5545082 B2 | 7/2014 |

(Continued)

OTHER PUBLICATIONS

Korean Office Action issued in Korean Application No. 10-2015-0121027 dated Jul. 20, 2016.

Primary Examiner — Thai Pham
(74) Attorney, Agent, or Firm — McDermott Will & Emery LLP

(57) ABSTRACT

A method for controlling an in-vehicle lamp includes receiving a signal for supplying a power into an in-vehicle lamp, maintaining an amount of current flowing through the in-vehicle lamp below a first threshold level during an initial driving section after the power is supplied, and maintaining the amount of current flowing through the in-vehicle lamp below a second threshold level which is lower than the first threshold level after the initial driving section.

17 Claims, 7 Drawing Sheets

(56) References Cited

FOREIGN PATENT DOCUMENTS

| | | |
|---|---|---|
| JP | 2015-020460 A | 2/2015 |
| KR | 10-0553645 B1 | 2/2006 |
| KR | 20-0420351 Y1 | 6/2006 |
| KR | 10-0717950 B1 | 5/2007 |
| KR | 10-1079904 B1 | 11/2011 |
| KR | 10-1431382 B1 | 8/2014 |

* cited by examiner

APPARATUS AND METHOD FOR LAMP CONTROL IN VEHICLE

CROSS-REFERENCE TO RELATED APPLICATION

This application claims the benefit of priority to Korean Patent Application No. 10-2015-0121027, filed on Aug. 27, 2015 with the Korean Intellectual Property Office, the disclosure of which is hereby incorporated by reference as if fully set forth herein.

TECHNICAL FIELD

The disclosure relates to an apparatus and a method for enhancing durability of lamps for use in a vehicle, and more particularly, to a device and a method, adapted for a vehicle, for controlling an inrush current in order to enhance durability of lamps in the vehicle.

BACKGROUND

A head lamp in a vehicle is considered a small size component but the headlamp can be of great importance with regard to function and design. In a functional view, the headlamp is basically for enhancing a driver's view and informing a vehicle's existence to other drivers or pedestrians. Further, since different types of vehicle styling can be achieved by the head lamps, as well as front ventilation grilles, the headlamps can be recognized as an important ornamental and a functional component.

As the headlamp, an incandescent lamp having a filament was used in the past. However, such an incandescent lamp has limits because of its short life and low luminance. After the incandescent lamp, a halogen lamp which is a kind of an incandescent lamp that has a small amount of a halogen was used as a headlamp of vehicles because the halogen lamp can emit a wide diffusion of light, can be easy to enhance a driver's view, and can be miniaturized or downsized. Further, in order to satisfy customer needs for a high-intensity, high-efficiency headlamp, a manufacturer can use a high-intensity discharge (HID) lamp for vehicle's headlamps.

Most vehicles are equipped with a lamp having a filament. However, if turned off, the temperature of the filament falls. As the temperature falls, the filament's resistance becomes lower. Thus, when the lamp is turned on after completely cooling off, an inrush current having a magnification of 1,300% a rated load for a very short time such as about 100 ms can flow in a moment throughout the filament in the lamp. The inrush current can shorten the headlamp's life. In order to overcome an issue of shortening the headlamp's lifespan by the inrush current, it is suggested that a wire in the lamp is made thicker. However, this suggestion can bring another issue of increasing a lamp's weight and a manufacturing cost.

SUMMARY

An apparatus and a method are for controlling an amount of current supplied to a bulb-styled lamp having a filament in a vehicle.

A method and an apparatus for controlling a power source supplied to an in-vehicle lamp during an initial driving section can be provided in order to improve lamp's operational safety and durability.

A method for controlling an in-vehicle lamp can include receiving a signal for supplying a power into an in-vehicle lamp. After the power is supplied, an amount of current flowing through the in-vehicle lamp is maintained below a first threshold level during an initial driving section. After the initial driving section, the amount of current flowing through the in-vehicle lamp is maintained below a second threshold level which is lower than the first threshold level.

During the initial driving section, it can be checked whether the amount of current flowing through the in-vehicle lamp is three times larger than a level of operating current. If the amount of current is three times larger than the level of operating current, the power supplied into the in-vehicle lamp can be blocked during a predetermined time.

If the amount of current is not three times larger than the level of operating current, it can be checked whether the amount of current flowing through the in-vehicle lamp is two times larger than a level of operating current. If the amount of current is not two times larger than the level of operating current, the initial driving section can be terminated.

When the amount of current, flowing through the in-vehicle lamp, is two times larger than a level of operating current, an error message regarding the in-vehicle lamp can be outputted.

An operation frequency of in-vehicle lamp during the initial driving section can be 1 kHz, while the operation of frequency of in-vehicle lamp after the initial driving section can be 80 Hz. Additionally, the initial driving section can be equal to, or shorter than, 200 ms.

Further, it can be checked whether an automotive electronics system operates.

When the amount of current, flowing through the in-vehicle lamp, is not larger than the first threshold level or the second threshold level but beyond a current limit for lamp protection, the power supplied into the in-vehicle lamp can be blocked during a predetermined time or turning off the in-vehicle lamp.

An apparatus for controlling an in-vehicle lamp can be engaged with a power supply configured to supply a power into an in-vehicle lamp. The apparatus can include an adjuster configured to control the power to maintain an amount of current flowing through the in-vehicle lamp below a first threshold level during an initial driving section and below a second threshold level, which is lower than the first threshold level, after the initial driving section.

The adjuster can check whether the amount of current flowing through the in-vehicle lamp is three times larger than a level of operating current during the initial driving section. If the amount of current is three times larger than the level of operating current, the adjuster can block the power supplied into the in-vehicle lamp during a predetermined time.

If the amount of current is not three times larger than the level of operating current, the adjuster can check whether the amount of current flowing through the in-vehicle lamp is two times larger than a level of operating current. If the amount of current is not two times larger than the level of operating current, the adjuster can terminate the initial driving section.

The adjuster can output an error message regarding the in-vehicle lamp, when the amount of current, flowing through the in-vehicle lamp, is two times larger than a level of operating current.

An operation frequency of in-vehicle lamp during the initial driving section can be 1 kHz, while the operation of frequency of in-vehicle lamp after the initial driving section can be 80 Hz. The initial driving section can be equal to, or shorter than, 200 ms.

The adjuster can check whether an automotive electronics system operates.

Further, the apparatus can include a controller configured to block the power supplied into the in-vehicle lamp during a predetermined time or to turn off the in-vehicle lamp, when the amount of current, flowing through the in-vehicle lamp, is not larger than the first threshold level or the second threshold level but beyond a current limit for lamp protection.

An apparatus for operating an in-vehicle lamp can be engaged with an automotive electronics system. The automotive electronics system can include a processing system that comprises at least one data processor and at least one computer-readable memory storing a computer program. The processing system is configured to cause the apparatus to supply a power into an in-vehicle lamp, and to control the power to maintain an amount of current flowing through the in-vehicle lamp below a first threshold level during an initial driving section and below a second threshold level which is lower than the first threshold level after the initial driving section.

The apparatus can check whether the amount of current flowing through the in-vehicle lamp is three times larger than a level of operating current during the initial driving section. If the amount of current is three times larger than the level of operating current, the apparatus can block the power supplied into the in-vehicle lamp during a predetermined time.

If the amount of current is not three times larger than the level of operating current, the apparatus can check whether the amount of current flowing through the in-vehicle lamp is two times larger than a level of operating current. If the amount of current is not two times larger than the level of operating current, the apparatus can terminate the initial driving section.

The apparatus can output an error message regarding the in-vehicle lamp, when the amount of current, flowing through the in-vehicle lamp, is two times larger than a level of operating current.

Advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
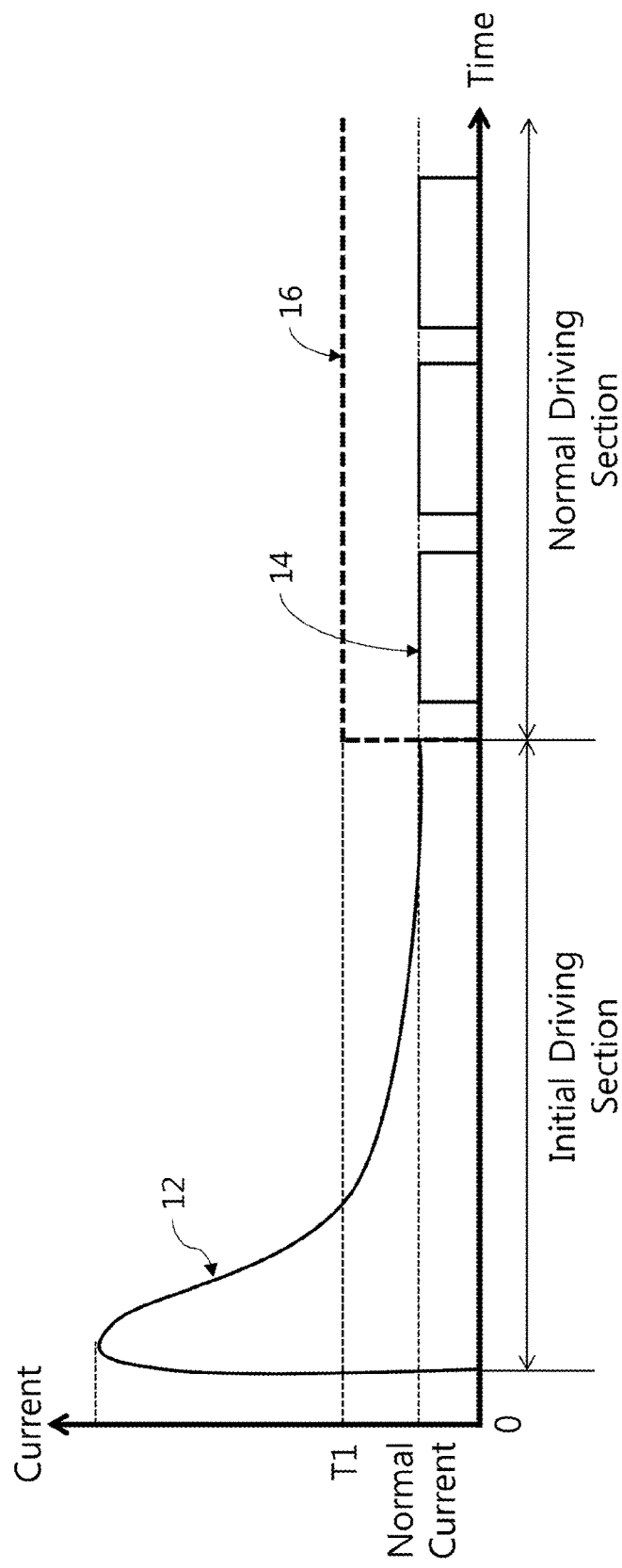
FIG. 1 shows an operation of a lamp including a bulb.

Reference will now be made in detail to the preferred embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

FIG. 1 shows an operation of a lamp including a bulb.

As shown, an initial driving section from a timing of turning on the lamp to a timing of stably operating the lamp exists. Herein, the initial driving section may be equal to or shorter than 200 ms. Since a filament included in the lamp may have little or no resistance theoretically, an amount of current flowing through the filament can be very large when a predetermined voltage is supplied into the lamp. The inrush current 12 flowing through the filament during the initial driving section, which is inordinately larger than a current for stable or general operation (e.g., a normal current), can be called an inrush current. The inrush current, input surge current or switch-on surge is the maximum, instantaneous input current drawn by an electrical device when first turned on.

The amount of inrush current 12 is larger than that of stable operation current, and may be larger than a threshold level 16 for controlling an amount of current flowing throughout the bulb during a normal driving section. For example, while an operation current 14 of 4.7 A flows through the lamp after the initial driving section, an inrush current 12 of 10 to 54 A can flow for about 30 ms after the power is supplied. After that, as the lamp's resistance increases, an overcurrent of 5.5 to 10 A can flow for about 30 to 200 ms.

After the initial driving section, an overcurrent flowing through the lamp may be avoided because the threshold level 16 is in place. However, since the threshold level 16 is not set up for the initial driving section, a large amount of inrush current 12 in response to the supplied power could flow.

Figure 2:
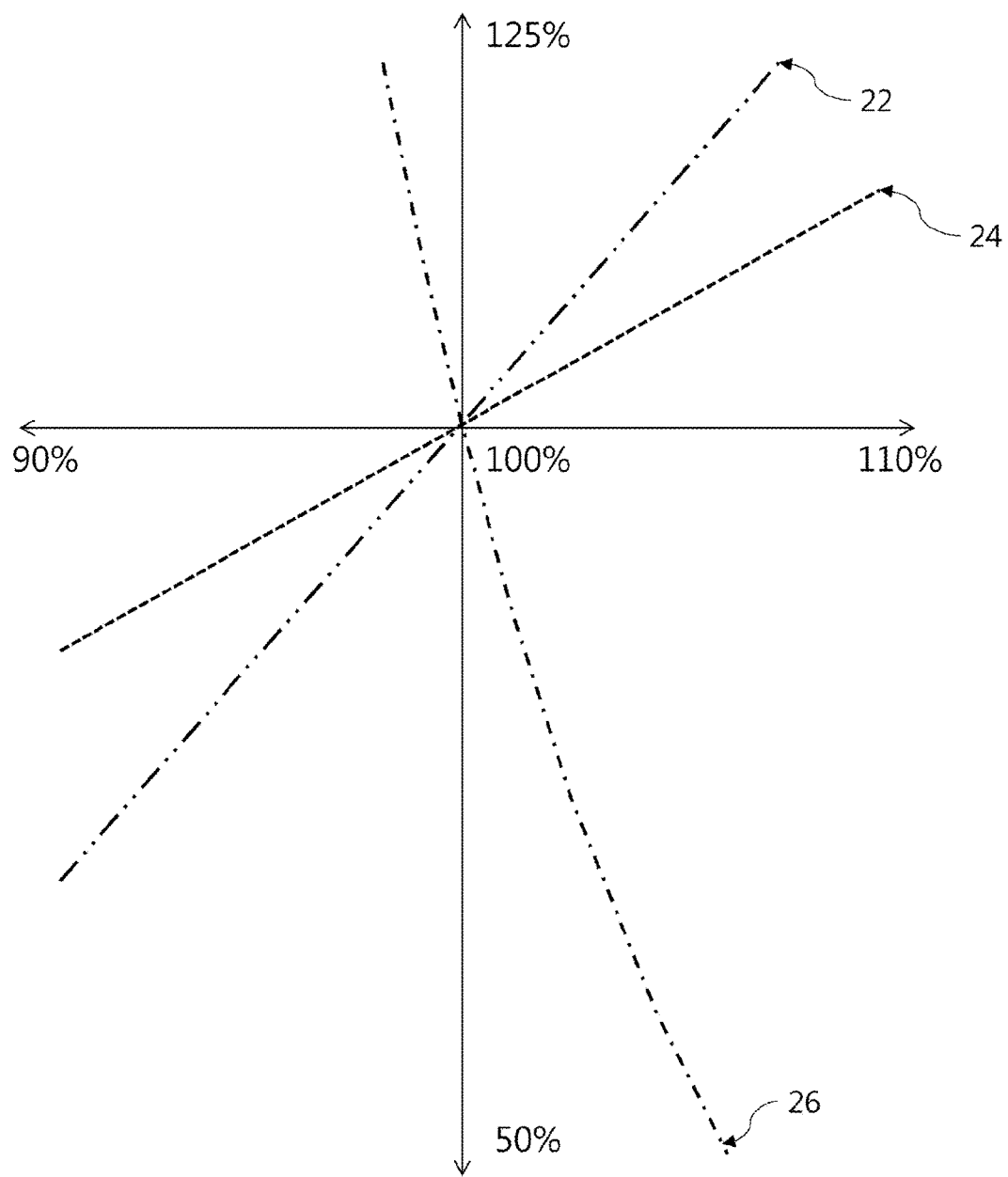
FIG. 2 describes a relationship between an inrush current and lamp's life.

FIG. 2 describes a relationship between an inrush current and a lamp's life. In FIG. 2, it is assumed that a power of 58 W (i.e., 13.2 V and 4.4 A) is 100%, and a lamp's life and luminance flux can be 100% when 100% power is supplied. FIG. 2 shows experimental data, i.e., variations of lamp's luminance flux 22 and lamp's life 26 in response to a changed power 24 supplied into the lamp.

As shown, the power 24 supplied into the lamp has a generally proportional relation to the lamp's luminance flux 22, while the supplied power 24 has an inverse relation to the lamp's life 26. For example, when an overvoltage or overcurrent which is larger than 100% operational power is supplied into the lamp, the lamp's luminance flux can be enhanced but the lamp's life can dramatically decrease.

Referring to FIGS. 1 and 2, in a case when there is no threshold level 16 during the initial driving section (e.g., 200 ms) in a process of controlling a lamp including a bulb, and the lamp is left as it is so that the inrush current 12 which can be larger several times than a stable operation current can be flowed through the lamp, the lamp's life 26 can be reduced.

Figure 3:
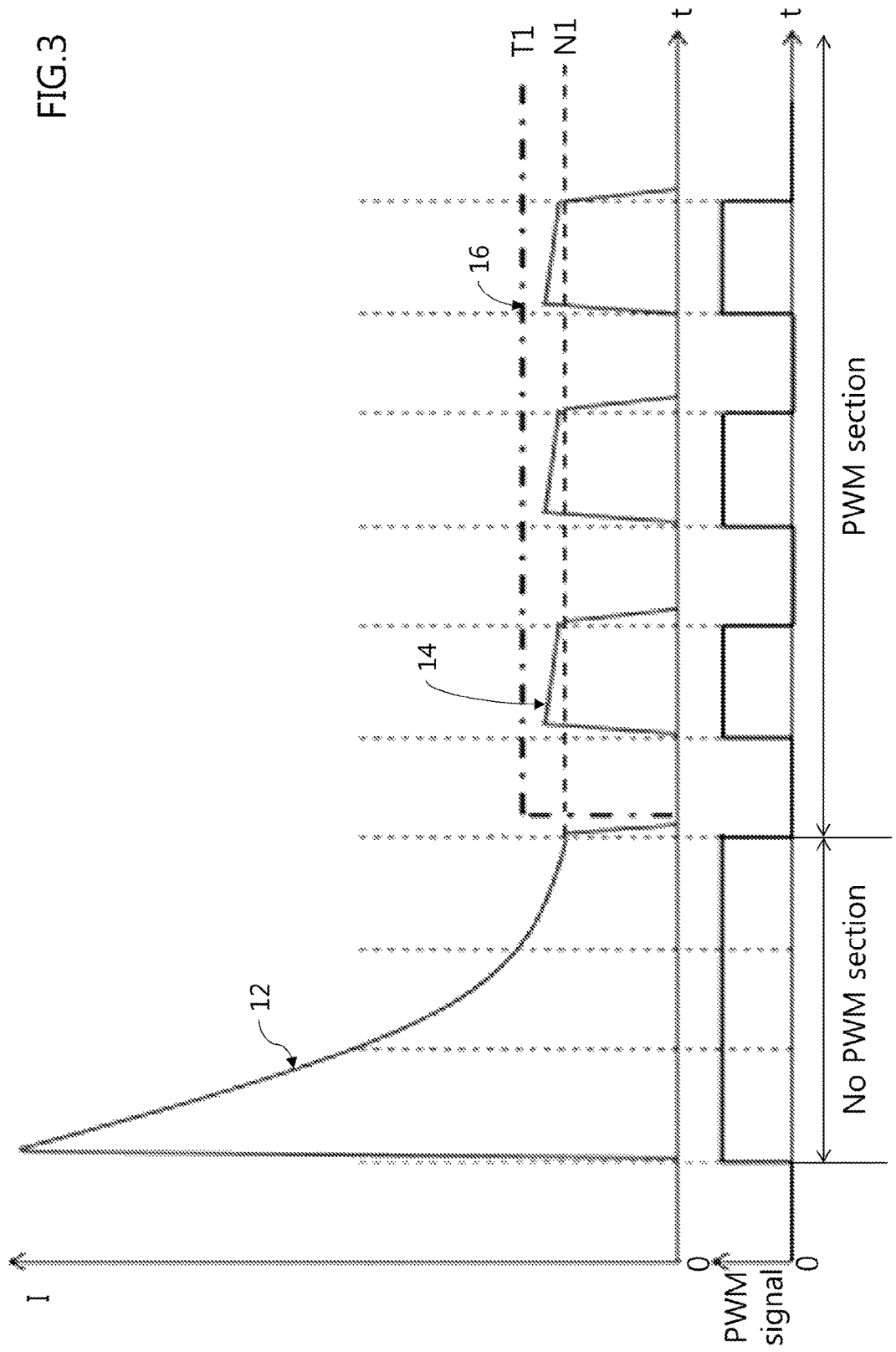
FIG. 3 shows a lamp control using a pulse width modulation (PWM)

FIG. 3 shows a lamp control using a pulse width modulation (PWM).

As shown, when a lamp including a bulb is turned on, an inrush current 12 can occur and a normal current 14 can flow through the bulb after a predetermined time. The lamp including the bulb can be controlled by the pulse width modulation (PWM). The pulse width modulation (PWM) is a term for describing a type of digital signal. The pulse width modulation can be used in a variety of applications including sophisticated control circuitry. For example, the pulse width modulation (PWM) can control an analog value by digitalizing the value. The analog value can be sampled every predetermined period, and signal's pulse width can be determined based on the sampled value.

In FIG. 3, the pulse width modulation is used for controlling the lamp during a section where a normal current 14 flows, i.e., a predetermined time after the lamp is turned on. Further, setting up a threshold level 16 with the pulse width modulation can avoid an overcurrent flowing through the lamp during an operation section.

However, during a predetermined time after the lamp is turned on, the signal's pulse width may be wide. Accordingly, regardless of an amount of current flowing through the lamp and the lamp's resistance, a power can be continuously supplied into the lamp during the predetermined time. As the lamp's resistance becomes larger after the predetermined time, the normal current 14 can flow. Herein, the reason why the signal's pulse width during the predetermined time is wide is to prevent a flicker of the lamp. If the pulse width modulation (PWM) used after the predetermined time is applied directly after the lamp is turned on, the lamp may flicker. When a driver or an operator is aware of the lamp's flicker, he or she may sense that the lamp is performing inconveniently. Thus, the pulse width modulation (PWM) may not be used during the predetermined time after the lamp is turned on. However, since the lamp is controlled by a signal which has a long or widely activated pulse width, an occurrence of the inrush current 12 cannot be restrained.

In addition, the threshold level 16 is not set up during the initial driving section. If the threshold level 16 is applied without the pulse width modulation (PWM), the lamp is lighted until a current flowing through the lamp reaches the threshold level 16, and then turned off when the current reaches the threshold level 16 because the power supplied into the lamp is blocked. Accordingly, since this control method retards the lamp's operation, the driver can experience, or sense, inconvenience. As described above, the lamp control method shown in FIG. 3 uses a control signal having a wide width covering a predetermined time after the lamp is turned on without any threshold level. After the predetermined time for sufficiently lighting the lamp, the pulse width modulation (PWM) may be applied with the threshold level 16. However, these methods can shorten the lamp's life when the lamp includes a bulb which has an endurance time influenced by an inrush current or an over current.

Figure 4:
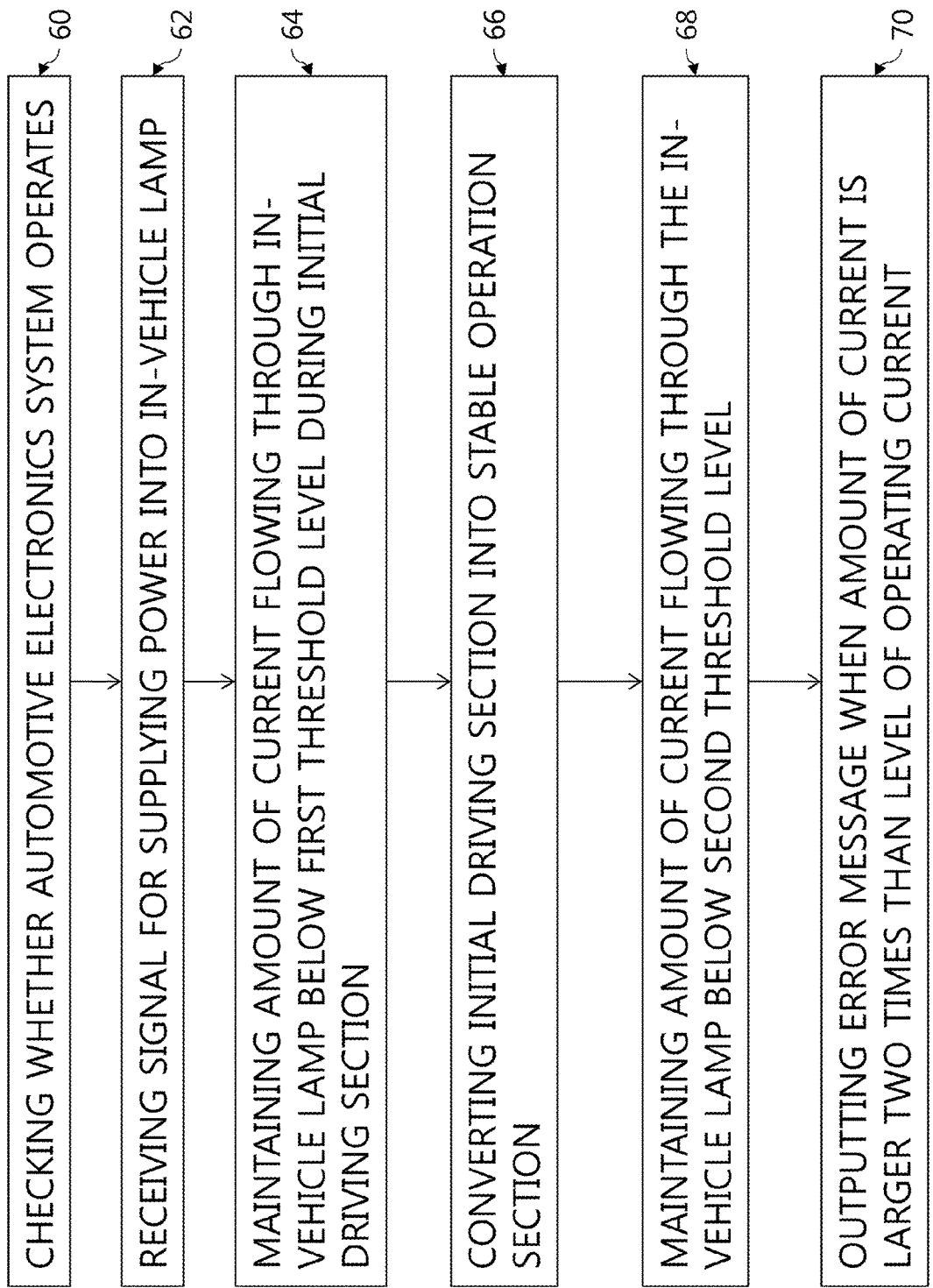
FIG. 4 shows a method for controlling an in-vehicle lamp.

FIG. 4 shows a method for controlling an in-vehicle lamp.

As shown, a method for controlling an in-vehicle lamp may include receiving a signal for supplying a power into an in-vehicle lamp (step 62). An amount of current flowing through the in-vehicle lamp may be maintained below a first threshold level during an initial driving section after the power is supplied (step 64). Further, the amount of current flowing through the in-vehicle lamp may be maintained below a second threshold level which is lower than the first threshold level after the initial driving section (step 68).

Further, the controlling method may include converting an initial driving section into a stable operation section 66. By the way of example but not limitation, the conversion from the initial driving section into the stable operation section can be done based on a predetermined time. For instance, a time of 150 ms or 200 ms after the signal for turning on the lamp is delivered can be considered the initial driving section. If the time of 150 ms or 200 ms passes, the initial driving section can be terminated and the lamp can operate in the stable operation section. Further, if a current flowing through the lamp after the signal for turning on the lamp is below a predetermined level, the initial driving section can be terminated and the lamp can operate in the stable operation section. For example, when a current flowing through the lamp is two times lower than a predetermined stable operation current flowing through the lamp during the stable operation section, the initial driving section can be terminated and the lamp can operate in the stable operation section. Further, levels of current and voltage can be used for setting up the initial driving section. If at least one of current level and voltage level reaches a predetermined condition, the initial driving section can be terminated. As used in this description, the term 'section' may include a time period.

As not shown in FIG. 4, in maintaining the amount of current below the first threshold level (step 64), it can be checked, during the initial driving section, whether the amount of current flowing through the in-vehicle lamp is three times larger (e.g., a first threshold level) than a level of the lamp's operating current. If the amount of current is three times larger than the level of operating current, the power supplied into the in-vehicle lamp can be blocked during a predetermined time. Herein, in order to avoid increasing the inrush current without a delay of the lamp's operation, the first threshold level can be considered three times the level of the lamp's operating current.

Further, as the control method, if the amount of current flowing through the lamp during the initial driving section is not three times larger than the level of operating current, it is checked whether the amount of current flowing through the in-vehicle lamp is two times larger (e.g., a second threshold level) than a level of operating current. If the amount of current is not two times larger than the level of operating current, the initial driving section can be terminated. Accordingly, after the power is supplied, an amount of current flowing through the lamp and the lamp's operation state can be controlled by using the first and the second threshold levels, which are different from each other.

As the control method, when the amount of current flowing through the in-vehicle lamp is two times larger than a level of operating current, an error message regarding the in-vehicle lamp can be outputted (step 70). The error message can contain a diagnostic trouble code (DTC) which is set up in a vehicle.

In the control method, it can be checked whether an automotive electronics system operates (step 60). For example, if the driver switches off the ignition, the automotive electronics system does not work, and the power otherwise supplied into the lamp can be not supplied.

As shown in FIG. 4, when the amount of current, flowing through the in-vehicle lamp, is not larger than the first threshold level or the second threshold level but beyond a current limit for lamp protection, the power supplied into the in-vehicle lamp can be blocked during a predetermined time or the in-vehicle lamp can be turned off. This process can be performed for lamp's operation safety, during lamp's stable operation section as well as the initial driving section. The current limit can be determined based on lamp's specification and performance.

Figure 5:
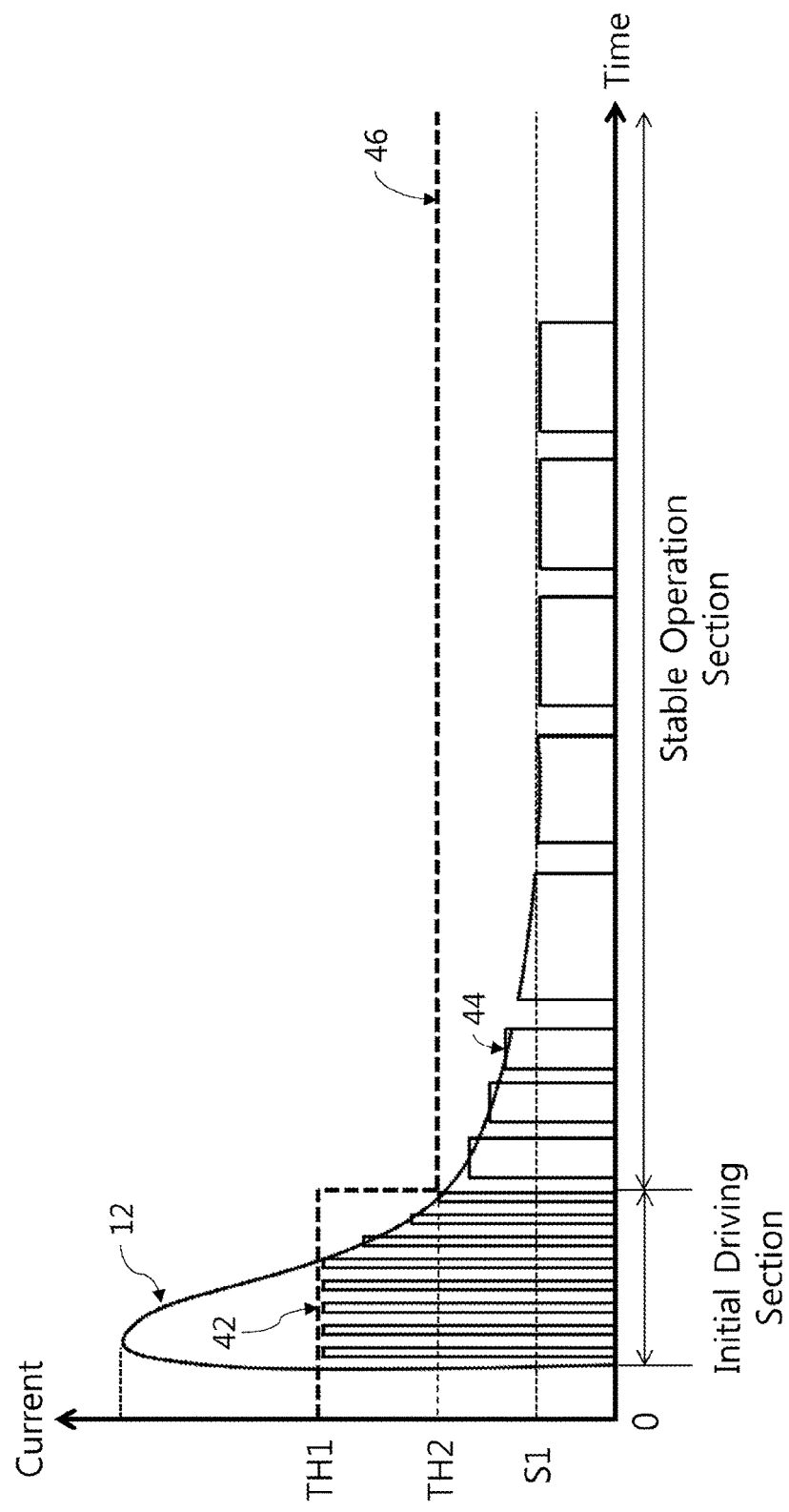
FIG. 5 describes a lamp operation according the method shown in FIG. 4.

FIG. 5 describes a lamp operation according the method shown in FIG. 4.

As shown, the lamp operation is supplied with a power controlled by the pulse width modulation (PWM). For example, an operation frequency of an in-vehicle lamp during the initial driving section can be 1 kHz, while the operation of frequency of the in-vehicle lamp after the initial driving section can be 80 Hz. Further, the initial driving section can be equal to, or shorter than, 200 ms. Further, a first threshold level TH1 and a second threshold level TH2 can be used for a current limit 46 in the lamp.

When the lamp is turned on, a power is supplied into the lamp. Without pulse width modulation (PWM) or the first threshold level TH1, an inrush current 12 can reach several times larger than a stable operation current. However, when the first threshold level TH1 is set up, the supplied power can be controlled by a pulse having a predetermined period. For example, in a case of using a pulse of 1 kHz frequency, a pulse's period is about $1/1000$ second and the power can be supplied and unsupplied every $1/2000$ second which is a half of the pulse's period. Additionally, because of the first threshold level TH1, a power can be blocked when a current flowing through the lamp reaches the threshold level TH1. Then, the blocked power can be supplied again after $1/2000$ second. According to these control methods, while the lamp is turned on after the power is supplied, the driver or the operator may not recognize the flicker of lamp, and an amount of inrush current 42 flowing through the lamp can be limited by the first threshold level TH1. Thus, a depreciation of the lamp's life can be avoided.

When the inrush current 42 limited by the first threshold level TH1 after the lamp is turned on becomes below the second threshold level TH2, the initial driving section can be terminated and the stable operation section can begin. The conversion from the initial driving section into the stable operation section can be determined by an amount of current flowing through the lamp. However, the conversion cannot be delayed beyond a predetermined maximum time (e.g., 150 ms or 200 ms).

If the inrush current 42 is below the second threshold level TH2, the lamp can operate in a stable operation section, and a pulse width of pulse width modulation (PWM) can be changed. The power can be supplied into the lamp based on the changed pulse width so that a normal current 44 can flow. By the way of example but not limitation, a pulse's frequency is changed from 1 kHz into 80 Hz. The pulse's period is changed from about $1/1000$ second to about $1/80$ second, and the power can be supplied or unsupplied every $1/160$ second. Even if a pulse's width is changed, the driver may not feel or sense inconvenience because a bulb in the lamp, containing a resistance level in a general operation, emits light and heat.

Figure 6:
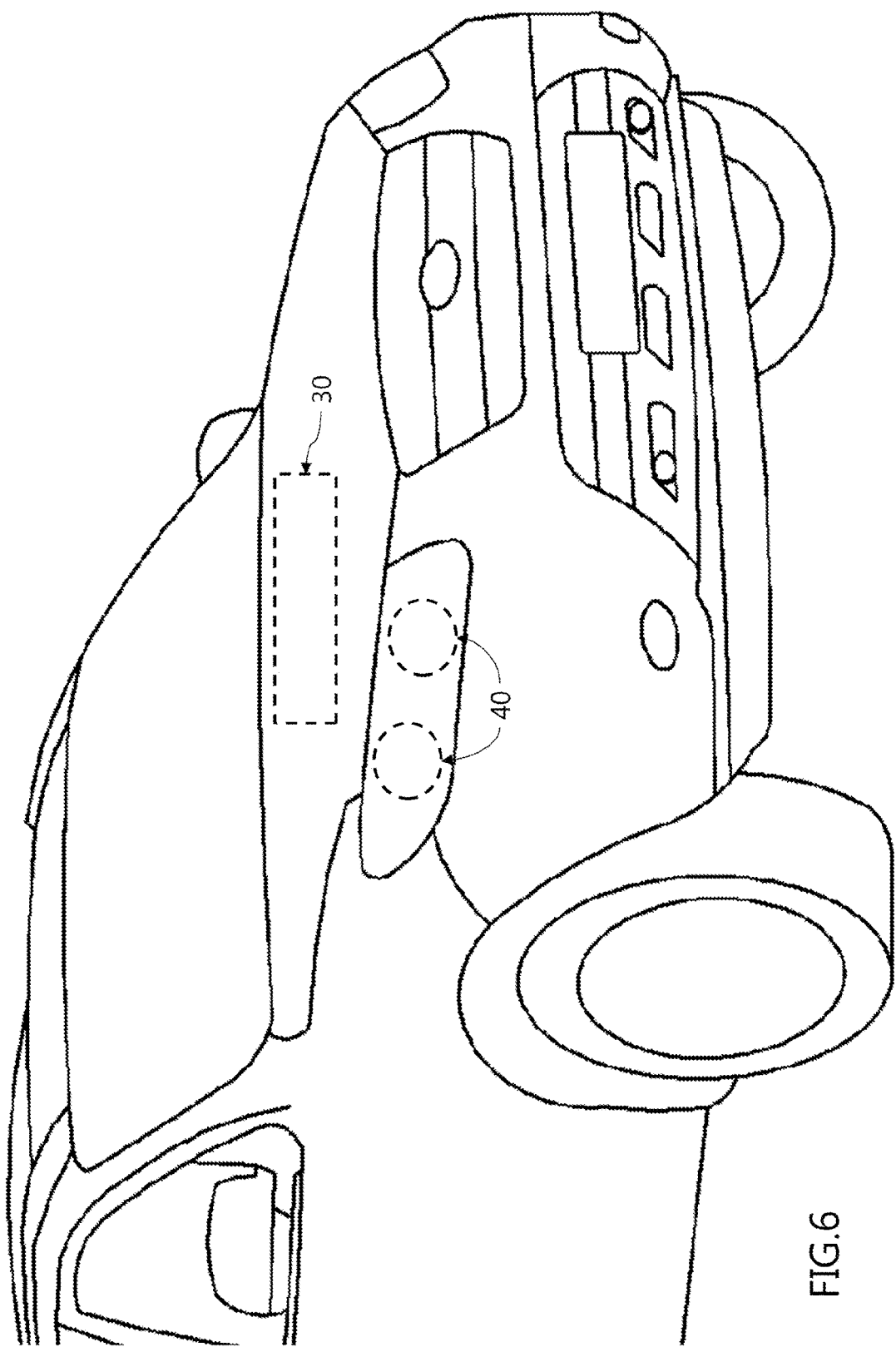
FIG. 6 shows a vehicle containing an in-vehicle lamp and a lamp controller.

FIG. 6 shows a vehicle containing an in-vehicle lamp and a lamp controller.

As shown, the vehicle can include an in-vehicle lamp control device 30 and an in-vehicle lamp 40. By way of example but not limitation, the in-vehicle lamp control device 30 can be included in an automotive electronics system, adapted or installed in a form of a separate control module, or as a program which can be executed by a data processing unit included in the automotive electronics system.

As not shown, the in-vehicle lamp 40 can include at least one of a headlight, a direction indicator, a complex taillight, a stop lamp, a license plate lamps, and so on. The headlight which may produce a main beam, a driving beam or a full beam, can include a main headlight and/or an auxiliary headlight. The complex taillight can include a tail lamp, a safety brake light, a side marker lamp, a flasher lamp, a warning flasher lamp, a repeater flasher lamp, a position lamp and/or a reflex reflector.

Figure 7:
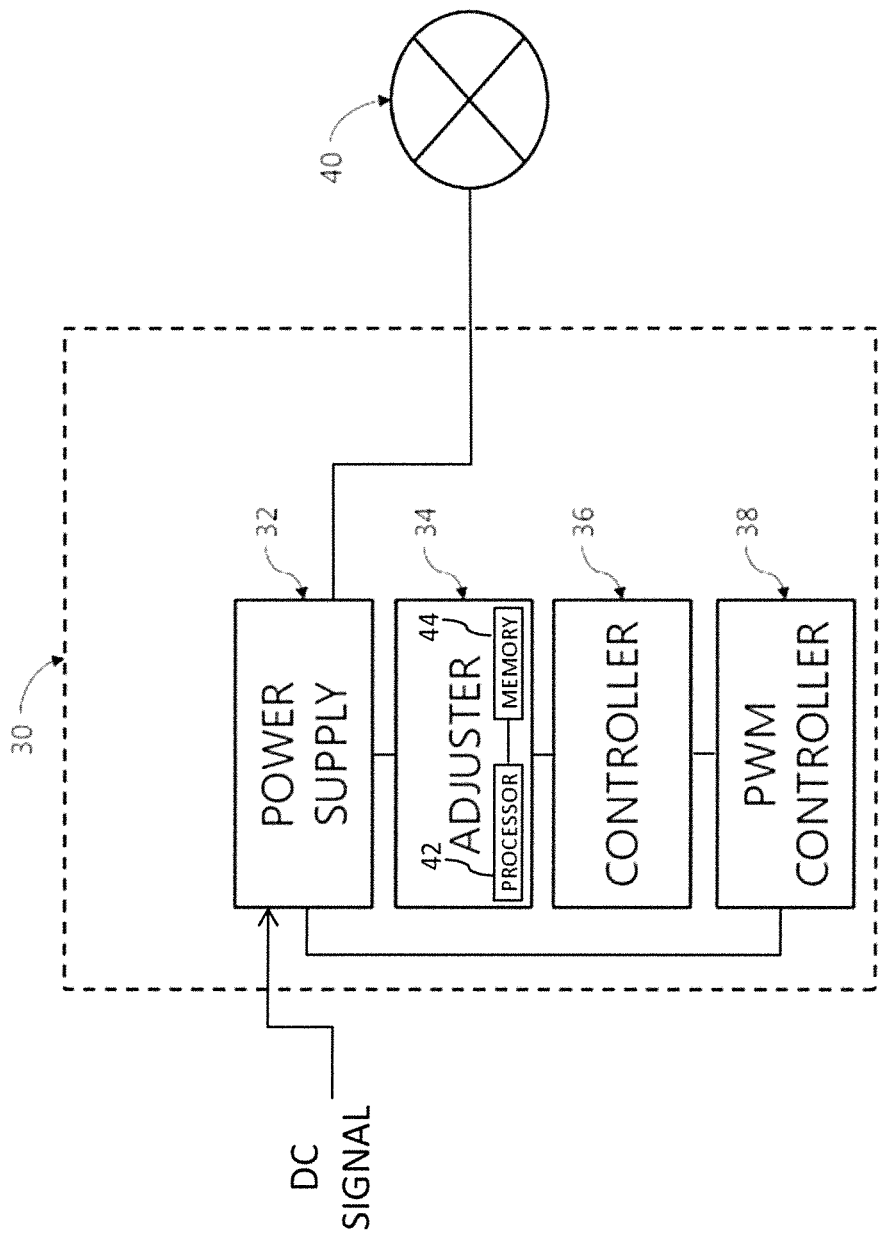
FIG. 7 describes an apparatus for controlling an in-vehicle lamp.

FIG. 7 describes an apparatus for controlling an in-vehicle lamp.

As shown, an in-vehicle lamp control device 30, which is for controlling an operation of an in-vehicle lamp 40, may include a power supply 32 configured to supply a power into an in-vehicle lamp, and an adjuster 34 configured to control the power to maintain an amount of current flowing through the in-vehicle lamp below a first threshold level during an initial driving section and below a second threshold level, which is lower than the first threshold level, after the initial driving section.

For example, the adjuster 34 can check whether the amount of current flowing through the in-vehicle lamp is the first threshold level (e.g., three times larger than a level of operating current) during the initial driving section. If the amount of current is three times larger than the level of operating current, the adjuster can block the power supplied into the in-vehicle lamp during a predetermined time.

Further, if the amount of current is not three times larger than the level of operating current, the adjuster 34 can check whether the amount of current flowing through the in-vehicle lamp is two times larger than a level of operating current. If the amount of current is not two times larger than the level of operating current, the adjuster 34 can terminate the initial driving section.

When the amount of current, flowing through the in-vehicle lamp, is two times larger than a level of operating current, the adjuster 34 can output an error message regarding the in-vehicle lamp 40.

The in-vehicle lamp control device 30 may include a PWM controller 38. The PWM controller can control a signal or a pulse of pulse width modulation (PWM) so that an operation frequency of in-vehicle lamp during the initial driving section is 1 kHz, while the operation of frequency of in-vehicle lamp after the initial driving section is 80 Hz. Herein, the initial driving section can be equal to, or shorter than, 200 ms.

Further, the adjuster 34 can check whether an automotive electronics system operates.

The in-vehicle lamp control device 30 can further include a controller 36 configured to block the power supplied into the in-vehicle lamp 40 during a predetermined time or to turn off the in-vehicle lamp 40 when the amount of current flowing through the in-vehicle lamp 40 is not larger than the first threshold level or the second threshold level, but is beyond a current limit for lamp protection.

Further, an apparatus for operating an in-vehicle lamp can be engaged with an automotive electronics system comprising a processing system. The automotive electronics system comprising the processing system can contain at least one data processor and at least one computer-readable memory storing a computer program. Herein, the processing system may be configured to cause the apparatus to supply a power into an in-vehicle lamp, and to control the power to maintain an amount of current flowing through the in-vehicle lamp below a first threshold level during an initial driving section and below a second threshold level which is lower than the first threshold level after the initial driving section.

Further, the processing system can be configured to cause the apparatus to check whether the amount of current flowing through the in-vehicle lamp is three times larger than a level of operating current during the initial driving section. If the amount of current is three times larger than the level of operating current, the apparatus blocks the power supplied into the in-vehicle lamp during a predetermined time.

If the amount of current is not three times larger than the level of operating current, the apparatus checks whether the amount of current flowing through the in-vehicle lamp is two times larger than a level of operating current. If the amount of current is not two times larger than the level of operating current, the apparatus terminates the initial driving section.

Further, the processing system can be configured to cause the apparatus to output an error message regarding the in-vehicle lamp when the amount of current, flowing through the in-vehicle lamp, is two times larger than a level of operating current.

As above described, the method and the apparatus can control an amount of current flowing through the lamp so as to maintain a lamp's life for as long as possible.

Further, the method and the apparatus can control an amount of current flowing through the lamp in order to enhance a lamp's operation safety and a lamp's durability, as well as to prevent make a driver feel uncomfortable or inconvenienced even when he or she manipulates the lamp.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, other types of storage mediums presented herein, and combinations thereof. If desired, the machine-readable medium may be realized in the form of a carrier wave (for example, a transmission over the Internet).

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A method for controlling an in-vehicle lamp, the method comprising:
   receiving a signal for supplying a power into an in-vehicle lamp;
   maintaining an amount of current flowing through the in-vehicle lamp below a first threshold level during an initial driving section after the power is supplied; and
   maintaining the amount of current flowing through the in-vehicle lamp below a second threshold level which is lower than the first threshold level after the initial driving section,
   wherein the step of maintaining the amount of current below the first threshold level comprises:
   checking whether the amount of current flowing through the in-vehicle lamp is three times larger than a level of operating current during the initial driving section;
   when the amount of current is three times larger than the level of operating current, blocking the power supplied into the in-vehicle lamp during a predetermined time.

2. The method according to claim 1, wherein the step of maintaining the amount of current below the first threshold level further comprises:
   when the amount of current is not three times larger than the level of operating current, checking whether the amount of current flowing through the in-vehicle lamp is two times larger than a level of operating current; and
   when the amount of current is not two times larger than the level of operating current, terminating the initial driving section.

3. The method according to claim 1, further comprising:
   when the amount of current, flowing through the in-vehicle lamp, is two times larger than a level of operating current, outputting an error message regarding the in-vehicle lamp.

4. The method according to claim 1, wherein an operation frequency of in-vehicle lamp during the initial driving section is 1 kHz, while the operation frequency of in-vehicle lamp after the initial driving section is 80 Hz.

5. The method according to claim 1, wherein the initial driving section is equal to, or shorter than, 200 ms.

6. The method according to claim 1, further comprising checking whether an automotive electronics system operates.

7. The method according to claim 1, further comprising:
   when the amount of current flowing through the in-vehicle lamp is not larger than the first threshold level or the second threshold level, but is beyond a current limit for lamp protection, blocking the power supplied into the in-vehicle lamp during a predetermined time or turning off the in-vehicle lamp.

8. An apparatus for controlling an in-vehicle lamp, the apparatus comprising:
   a power supply for supplying a power into an in-vehicle lamp; and
   an adjuster for controlling the power to maintain an amount of current flowing through the in-vehicle lamp below a first threshold level during an initial driving section and below a second threshold level, which is lower than the first threshold level, after the initial driving section,
wherein the adjuster checks whether the amount of current flowing through the in-vehicle lamp is three times larger than a level of operating current during the initial driving section, and
when the amount of current is three times larger than the level of operating current, the adjuster blocks the power supplied into the in-vehicle lamp during a predetermined time.

9. The apparatus according to claim 8, wherein, when the amount of current is not three times larger than the level of operating current, the adjuster checks whether the amount of current flowing through the in-vehicle lamp is two times larger than a level of operating current, and
when the amount of current is not two times larger than the level of operating current, the adjuster terminates the initial driving section.

10. The apparatus according to claim 8, wherein the adjuster outputs an error message regarding the in-vehicle lamp when the amount of current flowing through the in-vehicle lamp is two times larger than a level of operating current.

11. The apparatus according to claim 8, wherein an operation frequency of in-vehicle lamp during the initial driving section is 1 kHz, while the operation frequency of in-vehicle lamp after the initial driving section is 80 Hz.

12. The apparatus according to claim 8, wherein the initial driving section is equal to, or shorter than, 200 ms.

13. The apparatus according to claim 8, wherein the adjuster checks whether an automotive electronics system operates.

14. The apparatus according to claim 8, further comprising a controller for blocking the power supplied into the in-vehicle lamp during a predetermined time or for turning off the in-vehicle lamp when the amount of current flowing through the in-vehicle lamp is not larger than the first threshold level or the second threshold level but is beyond a current limit for lamp protection.

15. An apparatus for operating an in-vehicle lamp engaged with an automotive electronics system, the apparatus comprising at least one data processor and at least one computer-readable memory storing a computer program, wherein execution of the computer program causes the at least one data processor to:
supply a power into an in-vehicle lamp; and
control the power to maintain an amount of current flowing through the in-vehicle lamp below a first threshold level during an initial driving section and below a second threshold level which is lower than the first threshold level after the initial driving section,
wherein the apparatus checks whether the amount of current flowing through the in-vehicle lamp is three times larger than a level of operating current during the initial driving section, and
when the amount of current is three times larger than the level of operating current, the apparatus blocks the power supplied into the in-vehicle lamp during a predetermined time.

16. The apparatus according to claim 15, wherein, when the amount of current is not three times larger than the level of operating current, the apparatus checks whether the amount of current flowing through the in-vehicle lamp is two times larger than a level of operating current, and
when the amount of current is not two times larger than the level of operating current, the apparatus terminates the initial driving section.

17. The apparatus according to claim 15, wherein the apparatus outputs an error message regarding the in-vehicle lamp when the amount of current flowing through the in-vehicle lamp is two times larger a level of operating current.

* * * * *